United States Patent

Andersen et al.

[15] 3,686,640

[45] Aug. 22, 1972

[54] VARIABLE ORGANIZATION MEMORY SYSTEM

[72] Inventors: Stanley R. Andersen, Hopewell Junction; Robert G. Kinkade, Wappingers Falls, both of N.Y.

[73] Assignee: Cogar Corporation, Wappingers Falls, N.Y.

[22] Filed: June 25, 1970

[21] Appl. No.: 49,598

[52] U.S. Cl. ....................340/172.5
[51] Int. Cl. ....................G06f 3/00
[58] Field of Search ....................340/172.5

[56] References Cited

UNITED STATES PATENTS

| | | | |
|---|---|---|---|
| 3,340,512 | 9/1967 | Hauck et al. | 340/172.5 |
| 3,440,615 | 4/1969 | Carter | 340/172.5 |
| 3,460,094 | 8/1969 | Pryor | 340/172.5 |
| 3,292,151 | 12/1966 | Barnes et al. | 340/172.5 |
| 3,380,030 | 4/1968 | McMahon | 340/172.5 |
| 3,380,034 | 4/1968 | Cerny | 340/172.5 |
| 3,517,174 | 6/1970 | Ossfeldt | 340/172.5 |

OTHER PUBLICATIONS

IBM 7080 Data Processing System Reference Manual, Form A22-6560-1, 1960, pp. 10- 13, 25- 27, 33, 34, 53 & 54

*Primary Examiner*—Harvey E. Springborn
*Attorney*—Joseph L. Spiegel

[57] ABSTRACT

A variable organization memory system of two memory segments, each segment being of 1024 memory word by 9 data bit capacity. The segments are preferably semiconductor memory cells. Complete addressing capability for the maximum (2,048) memory word depth required is provided, while complete data line capability for the maximum (18) data bit length is included. System organization is varied by proper interconnection of various modifying input lines for memory word dimension and by driving data in and data out lines in parallel for the data bit dimension. Thus, for a 1024 memory word by 18 data bit organization, output levels to the memory segments from a buffer invert modifying input are permanently at an up logic level. This enables the two memory segments and gates set pulses to the data lines of both segments. Alternatively, when a 2,048 memory word by 9 data bit organization is desired, the inverted output from a buffered modifying input to the first memory segment is reinverted to the true complement of the input on the first modifying input and connected to the second memory segment while the data lines are driven in parallel.

3 Claims, 5 Drawing Figures

INVENTORS
STANLEY R. ANDERSEN
ROBERT G. KINKADE
BY Joseph L. Spiegel
Harry M. Weiss
ATTORNEYS

VARIABLE ORGANIZATION MEMORY SYSTEM

BACKGROUND OF THE INVENTION

1. Field of the Invention

This invention relates to a memory system, and in particular to a variable organization memory system, whereby a memory system of fixed capacity in terms of bit locations may be used in different modes, each mode being a different specific configuration of memory words by data bits. While not so limited, the invention finds immediate application to the design of semiconductor memory systems.

2. Description of the Prior Art

In the past, to obtain differently configurated memory systems, it was necessary to design completely separate memory systems, each one organized to the particular requirements of the using data processing system.

SUMMARY OF THE INVENTION

An object of the invention is a variable organization memory system.

Another object is such a system embodied in a single memory card.

Still another object is varying the memory word and data bit configuration of a memory card into different organizations without physical alteration of wiring or components on the card.

A further object is a single memory system capable of use in many different data processing systems.

These and other objects are accomplished in accordance with the present invention, one illustrative embodiment of which comprises providing a memory system of two memory segments, each segment being of 1,024 memory word by nine data bit capacity. The segments are preferably semiconductor memory cells. Complete addressing capability for the maximum (2,048) memory word depth required is provided, while complete data line capability for the maximum (18) data bit length is included. System organization is varied by proper interconnection of various modifying input lines for the memory word dimension and by driving data in and data out lines in parallel for the data bit dimension. Thus, for a 1,024 memory word by 18 data bit organization, output levels to the memory segments from a buffer invert modifying input are permanently at an up logic level. This enables the two memory segments and gates set pulses to the data lines of both segments. Alternatively, when a 2,048 memory word by nine data bit organization is desired, the inverted output from a buffered modifying input to the first memory segment is re-inverted to the true complement of the input on the first modifying input and connected to the second memory segment while the data lines are driven in parallel.

BRIEF DESCRIPTION OF THE DRAWING

The foregoing and other objects, features and advantages of the invention will be apparent from the following more particular description of the invention as illustrated in the accompanying drawing wherein.

DETAILED DESCRIPTION OF THE PREFERRED EMBODIMENTS

Figures 1, 2, 3:
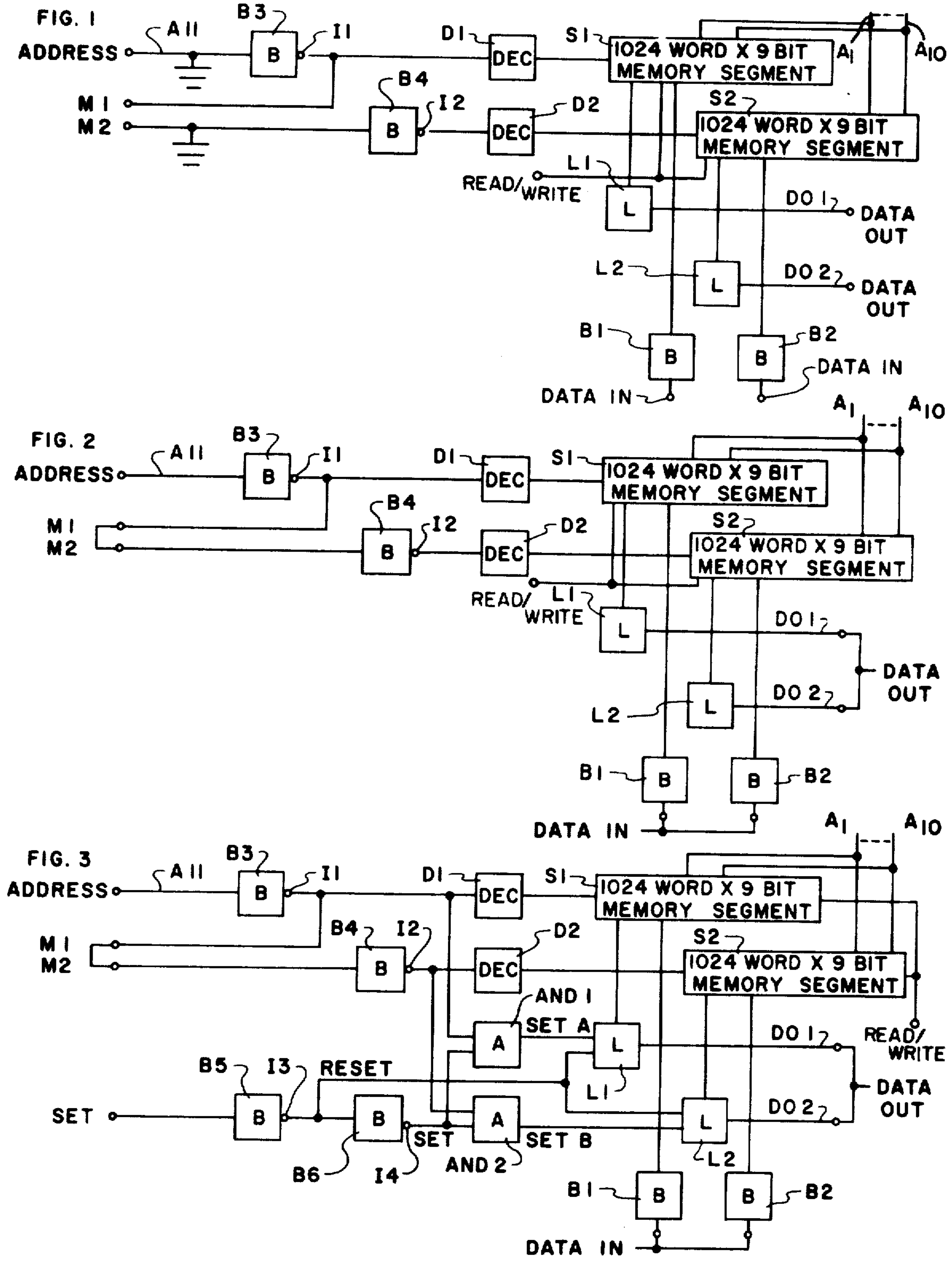
FIG. 1 is a block diagram of a variable organization memory system in a 1,024 memory word by 18 data bit configuration.
FIG. 2 is a block diagram of a variable organization of a variable organization memory system in a 2,048 memory word by nine data bit configuration.
FIG. 3 is a block diagram similar to FIG. 2, but with additional circuitry to allow for setting and resetting of data output latches in the event the output of an unselected memory segment is not a logical zero.

Reference will now be had to the drawing in which so much of a memory system is depicted as is required for an understanding of the present invention.

Referring now to FIG. 1, a memory system, preferably a semiconductor memory system, is schematically illustrated. The system is of fixed capacity in terms of bit locations and includes a first S1 and second S2 memory segment, preferably semiconductor integrated circuit storage chips of the type disclosed in U.S. Pat. No. 3,508,209 to Agusta et al., each having 1024 memory words by 9 data bit capacity. To provide this capacity, sufficient components are wired together on a printed circuit card in a predetermined format.

Each segment S1, S2 is provided with address lines A1 through A10 to the maximum memory word depth of each segment. In operation, a binary coded word is applied at the address input terminals to access a particular memory word.

Decoders D1, D2 associated with each memory segment permit enabling of that segment in response to signals at the input lines A11 and M2.

If the system is in the read mode of operation, data latches L1, L2 are set and a signal level will appear at the data out leads D01, D02 corresponding to the information stored at the memory word designated by the binary coded word present on the address input terminals A1 through A10.

If, however, the system is in the write mode of operation, the information stored at the memory word designated by the binary coded word present on the address input terminals A1 through A10 can be altered by the signal levels applied to the data-in terminals, through the buffers B1, B2.

For certain applications it may be necessary to have a memory system with a lesser memory word capacity but greater data bit capacity, whereas in other applications a larger memory word capacity with lesser data bit capacity would be required. For example, with reference to the system schematically illustrated in FIG. 1, in one application it might be necessary to have a system with a 1,024 word by 18 bit capacity, whereas in another application a system with a 2,048 word by nine bit capacity would be required.

In the past it was necessary to have either two separate memory systems, or at best one system which could be taken out of service and after extensive rewiring and substitution of components on the card could be used in a different configuration.

It is desirable, therefore, to be able to vary the memory word and data bit organization of a single, fixed capacity memory card without physical alteration of wiring or components on the card.

The memory system depicted in FIGS. 1–3 lends itself to such variable organization. Let the total bit capacity of the card $=(m \times n)/2$ where $m = 2{,}048$ memory words $n = 18$ data bits The memory system shown in FIGS. 1–3 can be changed from $m$ memory words by $n/2$ data bits to $m/2$ memory words by $n$ data bits simply by connecting modifying and data I/O lines at the card connector in a different manner.

FIG. 1 illustrates the $m/2$ word by $n$ data bit organization. In this organization, the A11 and M2 lines are tied to a down level at ground, while a connector tab modifying line M1 to the first memory segment is left open. Lines A11 and M2 are buffered at B3, B4, and their output levels inverted at I1, I2 to leave same, in this organization, permanently at an up logic level. This enables both memory segments S1, S2 and their latched outputs are transmitted individually to the card interface and read as such.

The data in lines are buffered at B1, B2. Data in is manipulated in a similar fashion during a write operation.

FIG. 2 illustrates the M word by $n/2$ bit organization. In this case tab M1 and M2 are shorted together to form a true complement generator from the input buffers and tab A11 is used for an additional input address line. This allows decoding to one out of two memory segments, each row containing $n/2$ bits. These outputs are then wired together at the connector interface in a pair-wise fashion since only one of the two latches associated with one data output line is energized each cycle. In the write mode data input buffers are driven in pairs so that each buffer drives one of the two memory segments, exclusively selected by the input address line A11.

The above technique is extended to more organizational variations by adding additional input address lines, modify lines and data I/O lines, thereby partitioning the segments into smaller arrays.

Referring now to FIG. 3, the variable organization feature is achieved, in the case of the m memory word by $n/2$ bit configuration, by splitting the system into two different segments. If the segment under the condition of no selection can be depended upon to be zero, then no additional gating is required to be able to perform the "data-oring" function on the data output line as shown in FIG. 2. If, however, the condition of the segment not being selected produces a one or indeterminate output, then additional gating is required, and in the case of FIG. 3 is shown in set A and set B AND gates AND 1, AND 2.

A set pulse is buffered at B5 and inverted at I3 to form a reset line which feeds all latches associated with both memory segments. The pulse is also buffered again at B6 and reinverted at I4 to form a set line. This set line is anded at AND1, AND 2 with the in-phase and out-of-phase signals of the address lines which determine which segment is to be cycled during a particular memory cycle. Thus, the set lines set the latches associated with the particular memory segment to be cycled, while the other latches associated with the memory segment not being cycled are reset only.

Thus, this arrangement allows the resetting of latches on the data bit outputs from the unselected segment without setting the unselected segment. Therefore, the latch output for the unselected segment can be depended upon to be a logical zero level. The other latch outputs will exclusively determine the condition of the wired or at the data output.

Figure 4:
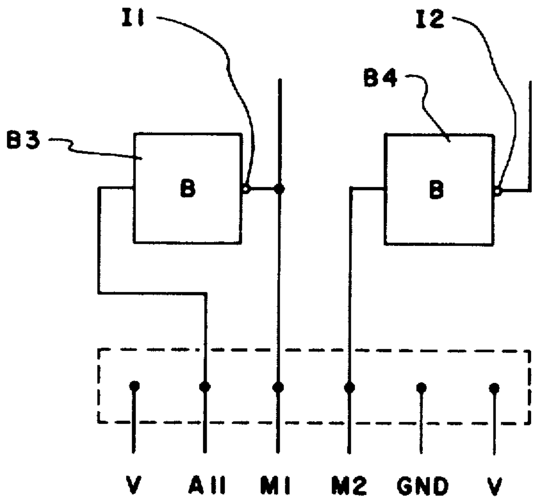
FIG. 4 schematically illustrates the address terminal area of a card upon which the memory system of FIGS. 1 and 2 has been arranged; and, FIG. 5 schematically illustrates the data area of a card upon which the memory system of FIGS. 1–2 has been arranged.

FIG. 4 schematically illustrates the input terminal area of a card upon which the memory system of FIGS. 1–2 has been arranged. Voltage V, A11, M1, M2 and ground are brought to holes on the card. For the $m/2$ by n organization, A11 and M2 holes and the ground hole are shorted together. For the $m$ by $n/2$ organization M1 and M2 are shorted together and the extra address line is brought in at A11. Additionally, an R-pac resistor module can be inserted in the holes to provide terminating pull-up resistors, with its M1 and M2 pins shorted together.

Figure 5:
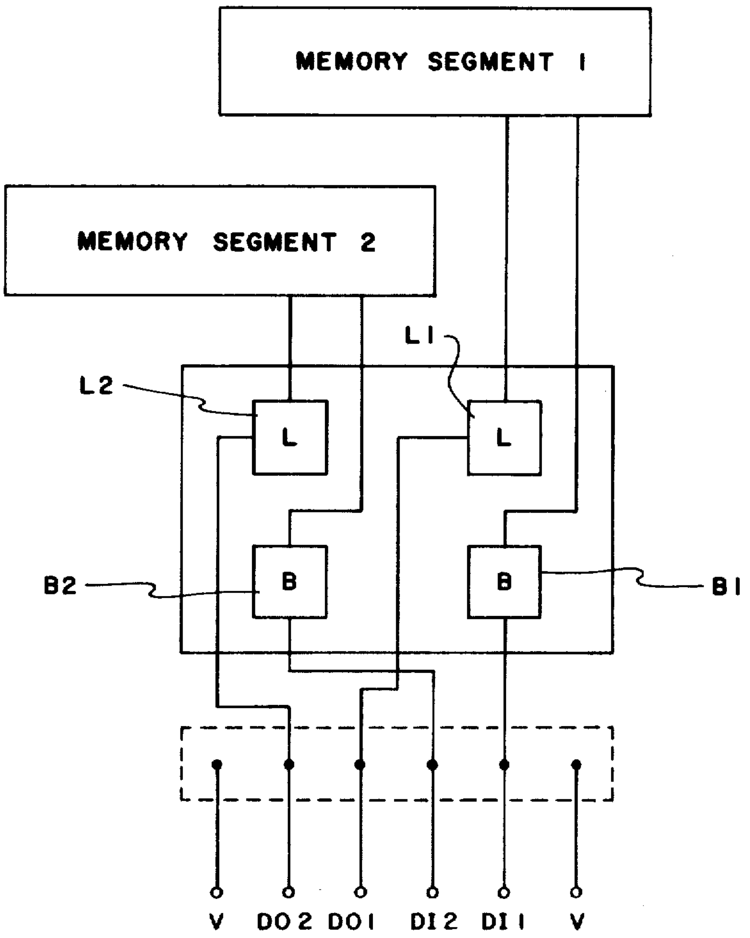

FIG. 5 schematically illustrates the data area of a card upon which the memory system of FIGS. 1–2 has been arranged. Sense/latch modules are connected to the card. Each such module contains two latches and two buffers. One latch/buffer pair is associated with one segment of the storage array, while the other latch/buffer pair is associated with the second segment of the array. Each latch takes care of one bit of data out and each buffer takes care of one bit of data in. For an 18 bit organization total, there are nine such modules.

Each module has data in inputs and data out outputs connected to holes in a printed circuit card. This configuration enables data either to flow freely in or out in which case the card is driven as a $m/2$ by $n$ organization, or by shorting data in 1 to data in 2 and data out 1 to data out 2, to narrow bit width to obtain the $m$ by $n/2$ organization. Additionally, an R-pac resistor module is inserted in the holes thereby including pull-up resistors in one or the other or both of the data out lines or in one or both of the data in lines.

The foregoing illustrates that the organization of the system can also be varied by insertion of resistor modules in the card at the appropriate hole location.

While the invention has been particularly described and shown with reference to the preferred embodiments thereof, it will be understood by those skilled in the art that various changes in form and detail and omissions may be made therein without departing from the spirit and scope of the invention.

What is claimed is:

1. A variable organization memory system comprising a memory system including a first and second memory segment, each segment comprising a plurality of memory storage locations providing a $m/2$ word by $n/2$ bit memory organization array;

means within said memory system for selecting the $m/2$ word by $n/2$ bit memory organization array of each segment to provide a memory system having either a $m$ word by $n/2$ bit memory organization array or a $m/2$ word by $n$ bit memory organization array while maintaining constant the total number of storage locations of said memory system wherein $m$ is the maximum number of words and $n$ is the maximum number of bits; and address and data lines connected to said system, the number of address lines being sufficient for accessing said m words and the number of data lines being sufficient for accessing said n bits.

2. A variable organization memory system in accordance with claim 1 wherein said memory system is a semiconductor system.

3. A variable organization memory system in accordance with claim 2 wherein said selecting means comprises true and complement means responsive to at least one of said address lines for enabling both of said segments to provide said $m/2$ word by n bit memory organization array or said $m$ word by $n/2$ bit memory organization array.

4. The system according to claim 3 including address and data lines connected to said system, the number of address lines corresponding to the maximum memory word depth of said system and the number of data lines corresponding to the maximum data bit length of said system.

* * * * *